United States Patent
Peters

(10) Patent No.: US 7,117,631 B2
(45) Date of Patent: Oct. 10, 2006

(54) MICROENCAPSULATED ANIMAL TRAP BAIT AND METHOD OF LURING ANIMALS TO TRAPS WITH MICROENCAPSULATED BAIT

(76) Inventor: John Peters, 8014 Lexington Ave., Hobe Sound, FL (US) 33455

( * ) Notice: Subject to any disclaimer, the term of this patent is extended or adjusted under 35 U.S.C. 154(b) by 0 days.

(21) Appl. No.: 10/866,403

(22) Filed: Jun. 11, 2004

(65) Prior Publication Data

US 2005/0274056 A1    Dec. 15, 2005

(51) Int. Cl.
*A01M 23/30* (2006.01)
(52) U.S. Cl. .......................................... 43/81
(58) Field of Classification Search .............. 43/81
See application file for complete search history.

(56) References Cited

U.S. PATENT DOCUMENTS

| | | | | | |
|---|---|---|---|---|---|
| 288,182 | A | * | 11/1883 | Morris | 43/81 |
| 528,671 | A | * | 11/1894 | Hooker | 43/81 |
| 615,219 | A | * | 11/1898 | Hotchkiss | 43/81 |
| 665,906 | A | * | 1/1901 | Hooker | 43/81 |
| 674,669 | A | * | 5/1901 | Botsford | 43/81 |
| 873,988 | A | * | 12/1907 | Chasse | 43/81 |
| 1,067,526 | A | * | 7/1913 | Larison | 43/81 |
| 1,345,137 | A | * | 6/1920 | Cowel | 43/81 |
| 1,366,509 | A | * | 1/1921 | Thiessen | 426/1 |
| 1,414,066 | A | * | 4/1922 | Beilharz | 43/81 |
| 1,456,981 | A | * | 5/1923 | Goss | 43/81 |
| 1,464,559 | A | * | 8/1923 | Britan | 43/81 |
| 1,473,242 | A | * | 11/1923 | Marshall | 43/81 |
| 1,485,494 | A | * | 3/1924 | Edwards | 43/81 |
| 1,488,475 | A | * | 4/1924 | Crawford | 43/81 |
| 1,501,384 | A | * | 7/1924 | Wills | 43/81 |
| 1,608,688 | A | * | 11/1926 | Williamson | 426/1 |
| 1,781,163 | A | * | 11/1930 | Clarkson | 43/81 |
| 2,175,754 | A | * | 10/1939 | Harrison | 43/81 |
| 2,190,089 | A | * | 2/1940 | Sund | 43/81 |
| 2,216,529 | A | * | 10/1940 | Brzykcy | 43/81 |
| 2,222,653 | A | * | 11/1940 | Chambless et al. | 43/81 |
| 2,348,981 | A | * | 5/1944 | Johnson | 43/81 |
| 2,368,581 | A | * | 1/1945 | Stilson | 43/81 |
| 2,416,481 | A | * | 2/1947 | Hollenbeck | 43/81 |
| 2,581,628 | A | * | 1/1952 | Burwell | 43/81 |
| 2,595,019 | A | * | 4/1952 | Sullivan | 426/1 |
| 2,793,465 | A | * | 5/1957 | Tramel | 43/81 |
| 2,911,756 | A | * | 11/1959 | Geary | 43/114 |
| 3,031,793 | A | * | 5/1962 | Waterman | 43/81 |
| 3,058,256 | A | * | 10/1962 | Wernham et al. | 43/81 |
| 3,623,659 | A | * | 11/1971 | Maierson et al. | 43/129 |
| 3,685,734 | A | * | 8/1972 | Paciorek et al. | 428/905 |
| 3,816,956 | A | * | 6/1974 | Sekula | 43/114 |
| 3,968,589 | A | * | 7/1976 | Basham | 43/81 |

(Continued)

FOREIGN PATENT DOCUMENTS

DE    204816 A    * 12/1908    ................. 43/81

(Continued)

*Primary Examiner*—Darren W. Ark
(74) *Attorney, Agent, or Firm*—McHale & Slavin PA

(57) ABSTRACT

The present invention is directed towards an animal trap kit and method for luring animals to trap. The kit preferably includes a any well known animal trap in combination with a microencapsulated bait that can be applied during manufacturing of new traps or existing traps alike. The microencapsulated scent may be applied to the trap via brush, spray or adhesive backed tape. The bait can be activated by merely scratching the scented portion of the trap. Alternatively the microcapsules may be constructed and arranged for timed release of the scents, flavors or phermones contained in the bait.

7 Claims, 4 Drawing Sheets

U.S. PATENT DOCUMENTS

| | | | | |
|---|---|---|---|---|
| 4,031,654 | A | * | 6/1977 | Gray .......................... 43/114 |
| 4,048,747 | A | * | 9/1977 | Shanahan et al. ............. 43/114 |
| 4,130,245 | A | * | 12/1978 | Bryson ........................ 239/34 |
| 4,306,369 | A | * | 12/1981 | Margulies ...................... 43/81 |
| 4,490,352 | A | * | 12/1984 | Miller ........................ 424/497 |
| 4,532,123 | A | * | 7/1985 | Gardner ...................... 424/497 |
| 4,677,786 | A | * | 7/1987 | Frank ............................ 43/82 |
| 4,696,844 | A | * | 9/1987 | Spector ...................... 428/905 |
| 4,711,049 | A | * | 12/1987 | Kness ........................... 43/81 |
| 4,800,671 | A | * | 1/1989 | Olson .......................... 43/114 |
| 4,803,799 | A | * | 2/1989 | Vajs et al. ..................... 43/82 |
| 4,842,761 | A | * | 6/1989 | Rutherford ................. 428/905 |
| 4,861,586 | A | * | 8/1989 | Schneider et al. ............ 424/84 |
| 4,874,611 | A | * | 10/1989 | Wilson et al. ................ 424/84 |
| 4,876,823 | A | * | 10/1989 | Brunetti ........................ 43/114 |
| 4,952,400 | A | * | 8/1990 | Tararuj et al. .............. 428/905 |
| 5,018,974 | A | * | 5/1991 | Carnahan et al. ........... 428/905 |
| 5,031,354 | A | * | 7/1991 | Olson .......................... 43/114 |
| 5,093,182 | A | * | 3/1992 | Ross .......................... 428/905 |
| 5,148,624 | A | * | 9/1992 | Schmidt ........................ 43/81 |
| 5,259,152 | A | * | 11/1993 | Taylor ........................... 43/81 |
| 5,306,499 | A | * | 4/1994 | Ohtsubo et al. ............. 424/405 |
| 5,375,367 | A | * | 12/1994 | Pust ............................... 43/81 |
| 5,384,981 | A | | 1/1995 | Cohen |
| 5,477,686 | A | | 12/1995 | Minas |
| 5,503,839 | A | * | 4/1996 | Saguchi et al. ............... 424/84 |
| 5,546,696 | A | * | 8/1996 | Parker, Jr. ..................... 43/81 |
| 5,572,825 | A | * | 11/1996 | Gehret ........................ 43/114 |
| 5,949,636 | A | | 9/1999 | Johnson et al. |
| 5,953,853 | A | * | 9/1999 | Kim .............................. 43/61 |
| 6,080,418 | A | * | 6/2000 | Sengupta et al. ........... 424/405 |
| 6,282,832 | B1 | * | 9/2001 | Manno ........................... 43/81 |
| 6,415,544 | B1 | | 7/2002 | Leyerle et al. |
| 6,505,434 | B1 | * | 1/2003 | Kloczko et al. .............. 43/114 |
| 6,508,031 | B1 | * | 1/2003 | Johnson et al. ................ 43/88 |
| 6,574,912 | B1 | * | 6/2003 | Johnson ......................... 43/88 |
| 6,735,899 | B1 | | 5/2004 | Anderson et al. |
| 2003/0091466 | A1 | * | 5/2003 | Benko et al. ................... 422/4 |
| 2004/0031189 | A1 | * | 2/2004 | Brown ......................... 43/131 |
| 2004/0216367 | A1 | * | 11/2004 | Klein .......................... 43/114 |

FOREIGN PATENT DOCUMENTS

| | | | |
|---|---|---|---|
| DE | 3415156 A1 | * | 10/1985 |
| DE | 3426513 A1 | * | 1/1986 |
| FR | 2604603 | * | 4/1988 |
| GB | 600965 A | * | 4/1948 |
| JP | 54-107516 A | * | 8/1979 |
| WO | WO 90/00005 | | 1/1990 |

* cited by examiner

MICROENCAPSULATED ANIMAL TRAP BAIT AND METHOD OF LURING ANIMALS TO TRAPS WITH MICROENCAPSULATED BAIT

FIELD OF THE INVENTION

This invention is directed to a reusable or disposable animal trap kit; more particularly to an animal trap bait that utilizes microencapsulation technology to provide controlled release of scents and/or flavors and may be utilized with a pre-existing animal trap such that the trap does not require perishable bait. Further, the microencapsulated bait may be easily applied to animal traps by the manufacturer or may be purchased as a kit and applied to the trap after purchase by the consumer.

BACKGROUND OF THE INVENTION

Throughout the centuries, rodents such as rats and mice have thrived among human civilizations. Rodents have been responsible for damage to property and the spread of infectious disease to humans and animals alike. In response, traps have been used by land owners and the pest extermination industry to exterminate rodents for more than one hundred years. Conventional means of rodent extermination include: snap traps, electronic traps, glue traps, VICTOR™ "Live Catch" traps, ultrasonic traps, magnetic traps, chemical repellents and poisons.

Snap traps include conventional mousetraps or "Quick Set" traps by VICTOR™. A traditional snap trap comprises a base with retaining means comprising a locking bar, wire bail and bait petal. The bail is retained in a set position by a locking bar that is released when the bait petal is triggered. The advantage of these snap traps are that they are inexpensive to manufacture, effective at killing rodents, and can be used in any environment. However, in the past they have been baited with perishable bait to attract the rodents. Moreover, the bait used must be sticky enough to ensure the rodent will disturb the trigger mechanism even when the animal touches the bait only lightly to prevent the rodent from feeding on the bait without being trapped. Further, the perishable bait can be difficult and time consuming to attach to the bait petal. In addition, most bait is temperature sensitive and can decompose before entrapment.

Electric or electronic traps include a plastic encasement with a pair of electrodes to detect the rodent and dispatch high voltage shock when activated, for example U.S. Pat. No. 5,949,636 to Johnson et al. and U.S. Pat. No. 6,735,899 to Anderson et al. These traps require the user insert bait through a bottom hole on the back plate with a plastic or wooden knife. The user must be sure to allow enough of the bait to extend through the entrance hole, since rodents are very cautious and generally need to sample the bait before entering into the internal encasement. This provides the rodents the opportunity to extract the bait without ever entering the trap. Additionally, the construction of these types of traps make the removal of unused perishable bait difficult.

Glue traps are paper or cardboard covered in a non-drying strong adhesive to entrap mice or rats, see U.S. Pat. No. 5,477,636 to Musket and U.S. Pat. No. 5,384,981 to Cohen. These traps are economical and easy to set, however they typically utilize grain such as wheat for bait. Grains may sour under damp conditions causing odors that are unacceptable for indoor use.

Numerous chemical control means have been employed to encapsulate chemical rodenticides to mask odors and/or taste. However, these poisons have several major drawbacks. Once chemically poisoned, a rodent may die and decompose in an inaccessible place, such as inside a wall, creating a possible odor problem or additional infestation. Moreover, a few species and strains of rodents will detect and avoid the chemical odor and others are resistant all together. Sometimes, household pets become the victims of these chemical control means. Still yet extensive precautions must be taken by the exterminator to prevent poisoning of himself during distribution of the chemicals.

Accordingly, what is lacking in the art is a safe effective and non-toxic animal trap bait that can be easily applied to new as well as pre-existing animal traps. The animal trap bait should be non-perishable, reusable and disposable by conventional means.

DESCRIPTION OF THE PRIOR ART

U.S. Pat. No. 4,490,352 to Miller is directed towards an encapsulated rodenticide. The patent teaches the inclusion of bait within an encapsulated thermoplastic polyamide. The bait is a zinc phosphate used as a toxicant; the encapsulation masks the odor and taste.

Similarly, WIPO Publication: WO 90/00005 to Redding is directed towards a microencapsulated poison containing a pesticide core material surrounded by lure outer coating. The lure coating comprises a food, sugar or pheromone.

United States Pre-Grant Publication 2004/0031189 to Brown is directed toward a poison bait module, an olfactory attractor portion disposed adjacent the poison portion and a visual attractor portion, wherein the olfactory attractor portion comprises food. The visual attractor portion comprises a reflective material.

Poisons of any kind require very serious safety considerations for storage and distribution. Gloves must be worn when handling poisons and respirators must be utilized to avoid inadvertent inhalation. Coated and/or microencapsulated poisons require additional considerations. The poisons of the prior art are generally coated with a bright and attractively scented material to mask the poison contained therein. Brightly colored and/or attractively scented granules may be mistaken for food by children and/or family pets and ingested.

U.S. Pat. No. 6,508,031 to Johnson et al. is directed towards a Trapper T-REX rodent trap with a removable bait container. The configuration of this trap is advantageous in that it may be placed into the set position with the user's foot without the need to bend down or touch the soiled trap with the hands. However, it requires that fresh bait be placed into a removable bait cup.

The article "'Death by chocolate' trap for mice", Newscientist.com, discloses a chocolate-scented mousetrap to catch pests without the need for bait. The article discloses the construction of the traditional mousetrap using ABS plastic granules mixed with chocolate essence. However, the chocolate fragrance fades after six months and cannot be reactivated.

While the foregoing described prior art devices have improved the art and in some instances enjoyed commercial success, there remains nonetheless a continuing need in the art for evermore improved animal trap constructions.

SUMMARY OF THE INVENTION

The present invention described herein is a microencapsulated bait for new as well as pre-existing animal traps that may be either applied during the manufacturing stage or after purchase by the consumer to attract pests to the trap.

Rodents such as mice, rats and the like do not have good eyesight and therefore generally rely on their elevated olfactory senses to find food. While most rodents will eat anything when food is scarce. Mice are particularly attracted to sweet smells, e.g. chocolate and fruit, while rats are more attracted to protein-based foods such as peanut butter, peanut oil, bacon and other meats. Rodents are also attracted to pheromones. Pheromones are biochemicals secreted by the animal to communicate to others of the same species, they act as signposts, guiding rodents to food, throughways and safe territories.

Microencapsulation or "scratch-and-sniff" technology was first developed for use in NCR (no carbon required) paper and has been used effectively in other areas, for example, to provide perfume samples in advertisements. The microencapsulation process generally involves mixing the material to be encapsulated, such as scent or pheromone, with a polymer and then, through a number of controlled steps fragile microcapsules that contain the material are produced. The microcapsule wall protects the encapsulated material from the effects of oxidation and UV light extending the effective life of the material. The microcapsules can be imbedded or layered onto the surface of a substrate for storage and/or use. When the user scratches, or otherwise disturbs, the coated substrate surface some of the microcapsules are fractured and the material contained within is emitted.

In addition, the encapsulated material may be released from within the microcapsules by diffusion through pores in the microcapsule wall. This creates a controlled time-release product. The length of time over which the encapsulated material is released may be altered to suit a particular need.

Accordingly, it is an objective of the instant invention to provide a microencapsulated scent, flavor and/or pheromone type bait that can be easily applied to new as well as pre-existing animal traps for luring animals thereto.

It is another objective of the instant invention to teach a microencapsulated bait for animal traps that can be sprayed, brushed or supplied on an adhesive backed substrate and placed proximate the trigger of the trap for attracting pests thereto.

Still another objective of the instant invention to teach an adhesive backed animal trap bait that includes rows, columns, grids or arrays of microencapsulated scent areas that may be selectively activated.

Yet another objective of the instant invention is to teach an animal trap bait that includes rows, columns, grids or arrays of microencapsulated scent areas each of which may be selectively activated and each of which may be directed to a different animal.

Still yet another objective of the instant invention is to teach microencapsulated baits for use in animal traps that are targeted to specific animals, i.e. sweet smells for mice, protein-based smells for rats.

A further objective of the instant invention is to teach a microencapsulated animal trap bait kit which saves time, since pest control technicians and other end users can use these traps without applying traditional perishable bait thereto.

Yet a further objective of the instant invention to teach microencapsulated animal trap baits that can be utilized both indoors and outdoors without decomposing or influence by environmental conditions.

Still yet a further objective of the instant invention is to teach microencapsulated baits for animal traps that will be effective against various forms of pests, including, but not limited to various rodents, insects, gophers, squirrels and birds.

An even further object of the present invention to teach microencapsulated animal bait that will be effective in luring pests when used in combination with pre-existing trapping means, including but not limited to, snap traps, VICTOR™ Live Catch traps, T-REX traps, electronic traps and glue traps.

Other objects and advantages of this invention will become apparent from the following description taken in conjunction with the accompanying drawings wherein are set forth, by way of illustration and example, certain embodiments of this invention. The drawings constitute a part of this specification and include exemplary embodiments of the present invention and illustrate various objects and features thereof.

DETAILED DESCRIPTION OF THE INVENTION

Figure 1:
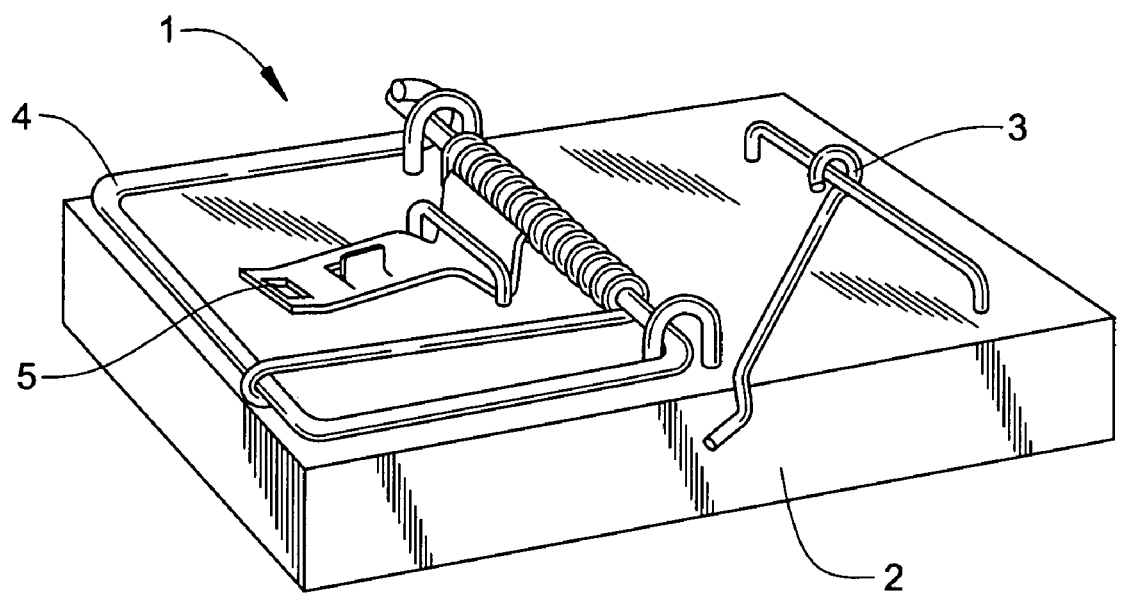
FIG. 1 is a perspective view of a conventional snap trap.

The instant invention has developed an innovative way in which to use microencapsulation technology to catch animals, preferably rodents, in a trap. FIG. 1 is illustrative of a known prior art snap trap 1 for which the instant invention may be utilized. The trap includes a base 2 with a retaining means comprising a locking bar 3, a spring activated bail 4 and bait petal, or trigger 5. The bait petal 5 comprises a v-shaped lip, such that when the bail 4 is pulled in a loaded position, said locking bar 3 is placed over the bail 4 and is in contact with said v-shaped lip. One of ordinary skill in the art will recognize the size of the trap can be adjusted to a size appropriate for the animal for which the trap is directed. One of ordinary skill in the art will also recognize that the instant invention may be utilized with other types animal traps (not shown) that may include, but should not be limited to electrical traps, glue traps, live catch traps, ultrasonic traps, magnetic traps and suitable combinations thereof.

Figure 2:
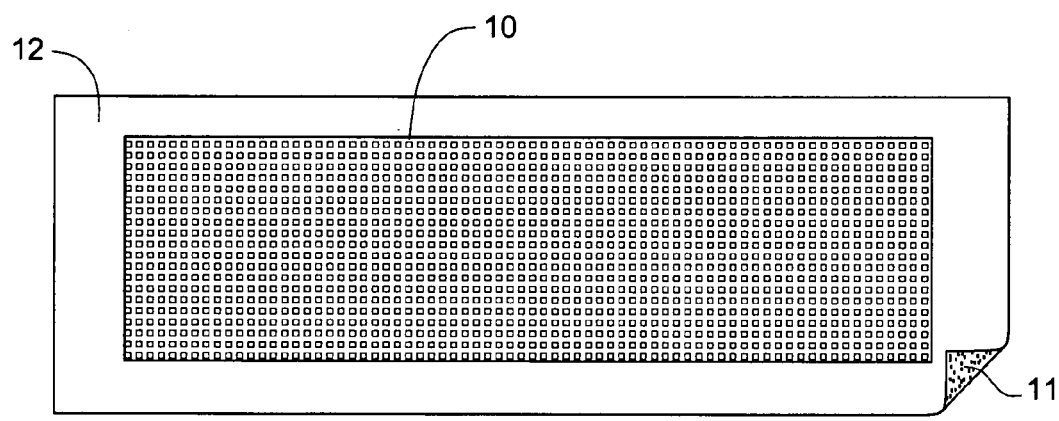
FIG. 2 is a perspective view of one embodiment of the instant invention, illustrating an adhesive backed flexible substrate having a single microencapsulated scent release area.

Referring to FIG. 2, a flexible bait substrate having a single microencapsulated scent release area is illustrated. The bait substrate 12 includes a single scent release area 10 of microencapsulated bait thereon. The substrate 12 is preferably manufactured from materials well known in the art used for adhering microencapsulated scents thereto. The substrate preferably includes an adhesive layer 11 for adhering the bait to wood, metal, plastic or other substrates from which traps can be manufactured. Skilled persons will appreciate that the sizes of the substrate 12 and scent release area 10 can be adjusted to conform to the size of the bait petal 5 and can be adapted to the size of the animals to which the scent release areas 10 are directed. Moreover, the scent release area 10 may cover all or part of the substrate 12. Although the substrate 12 and scent release area 10 are both shown as rectangular, skilled persons would realize that the scent area 10 or substrate 12 could be any variety of shapes, sheets or rolls (not shown).

Moreover, one of ordinary skill will appreciate that the scent release areas 10 can be directly incorporated into the materials used to construct some or all of the trap components, e.g. bait petal, base, locking arm, etc. Additionally, the substrate 12 can be applied with a natural or synthetic solution, compound or mixture that smells or tastes like the desired bait, for example peanut butter or chocolate, thereby creating a delocalized scent release area 10. Such microencapsulated scenting/flavoring agents are known in the art and are commercially available from a variety of sources, including the Ronald T. Dodge Company in Dayton, Ohio and Minnesota Mining and Manufacturing Company (3M) in St. Paul, Minn.

Microencapsulation can be produced by a variety of methods known in the art, for example macroemulsion processes, entrapment/matrix encapsulations, etc. The amount and density of scent/flavor producing agents, e.g. microcapsules, produced by the microencapsulation process can be adjusted to provide the desirable fragrance release characteristics based on pressure, friction or other factors. Additionally, the porosity of the microcapsule walls can be adjusted such that the encapsulated scent is released over an extended period of time. Since the animals that are the desired targets of the present invention are generally scavengers, they have a highly developed sense of smell. Consequently, the scent intensity of the present invention can be manufactured well below what would be noticeable to humans.

Figure 3:
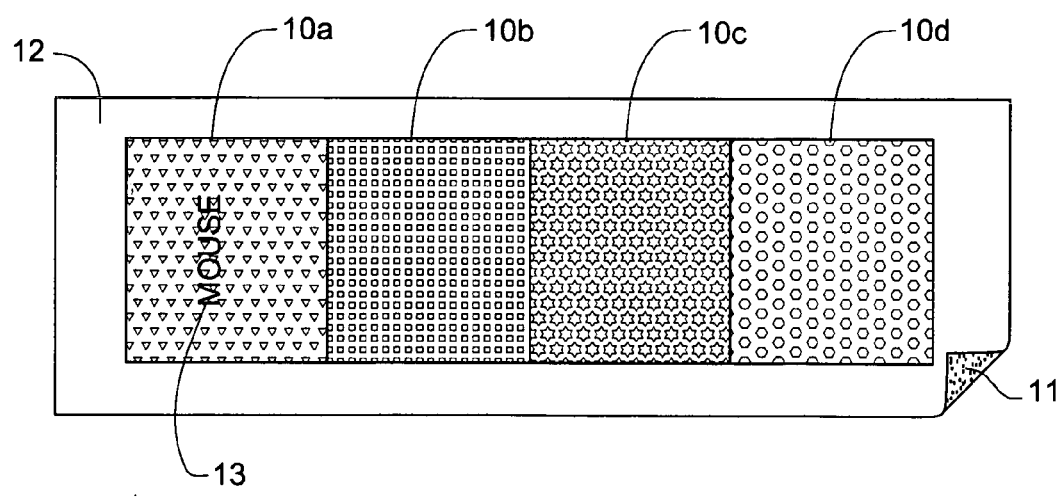
FIG. 3 is a perspective view of a one embodiment of the instant invention, illustrating an adhesive backed flexible substrate having multiple microencapsulated scent release areas.

Referring to FIG. 3, an alternate embodiment of the instant invention having an array of preformed multiple scent areas 10a, 10b, 10c, and 10d on a substrate 12 is shown. The scent release areas 10a, 10b, 10c, and 10d can be scented and/or flavored with the microencapsulated bait of the present invention. The scent release areas 10a, 10b, 10c, and 10d can have different fragrances and/or flavors, e.g. chocolate and peanut butter, such that the consumer can activate the desired scent targeted for the specific pest. For example, if the consumer has a rat problem, the product of the instant invention can come in a kit that includes a trap and the array of multiple scent areas 10a, 10b, 10c, and 10d so that the consumer can simply scratch one or more of the scent areas to activate the scent, flavor or pheromone contained therein.

Figure 4:
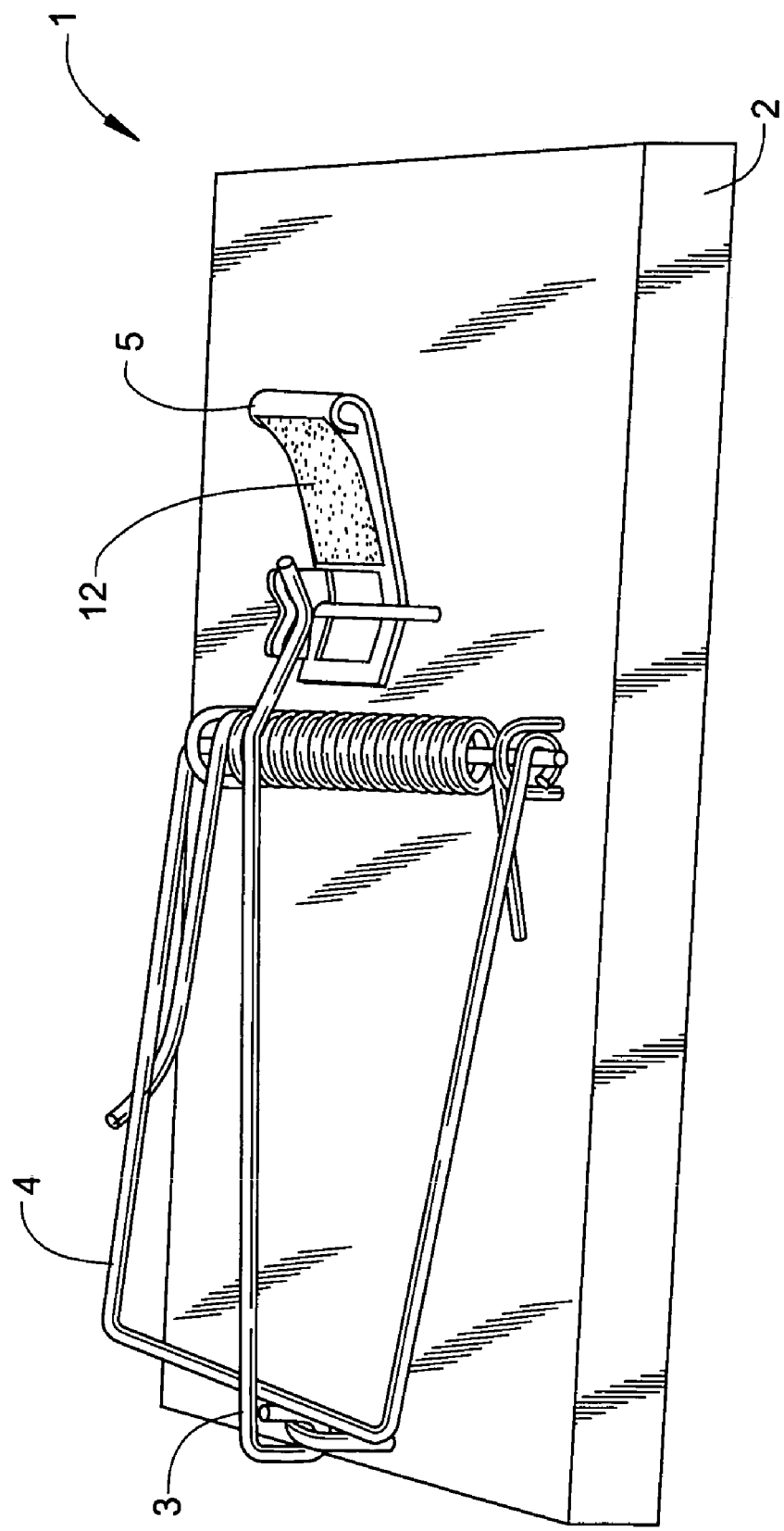
FIG. 4 is an perspective view of a conventional snap trap, illustrating microencapsulated scent positioned on the bait petal thereof.

Referring to FIG. 4, a conventional snap trap 1 is illustrated with the microencapsulated bait of the instant invention positioned on the bait petal 5 of the trap. In this embodiment the scent release portion 10 is layered onto a flexible substrate 12. In a most preferred embodiment the flexible substrate includes an adhesive backing 11 (FIG. 3) One skilled in the art would recognize that the scent release portion 10 could be ruptured to emit scent either prior to attachment to the bait petal 5 or after attachment, but preferably before positioning the bail 4 into the engaged position. Additionally, the substrate 12 seen in FIG. 2, or the substrate array 12 in FIG. 3 could include scent area(s) 10, 10a, 10b, 10c, 10d comprising a pheromone directed to a specific species of animal. The substrate 12 could also include indicia 13 (FIG. 3) that specifies to the end user what animal the scent areas are directed to attract. The indicia could be letters or symbols well known in the art.

Alternatively, all of the scent release areas 10a, 10b, 10c, and 10d in FIG. 3 could have the same fragrances and/or flavors such that the consumer can activate a different scent area, i.e. 10b, after the scent of the first, 10a, has faded. This is an especially useful feature for pest control tradesmen who reuse the same traps repeatedly.

Figure 5:
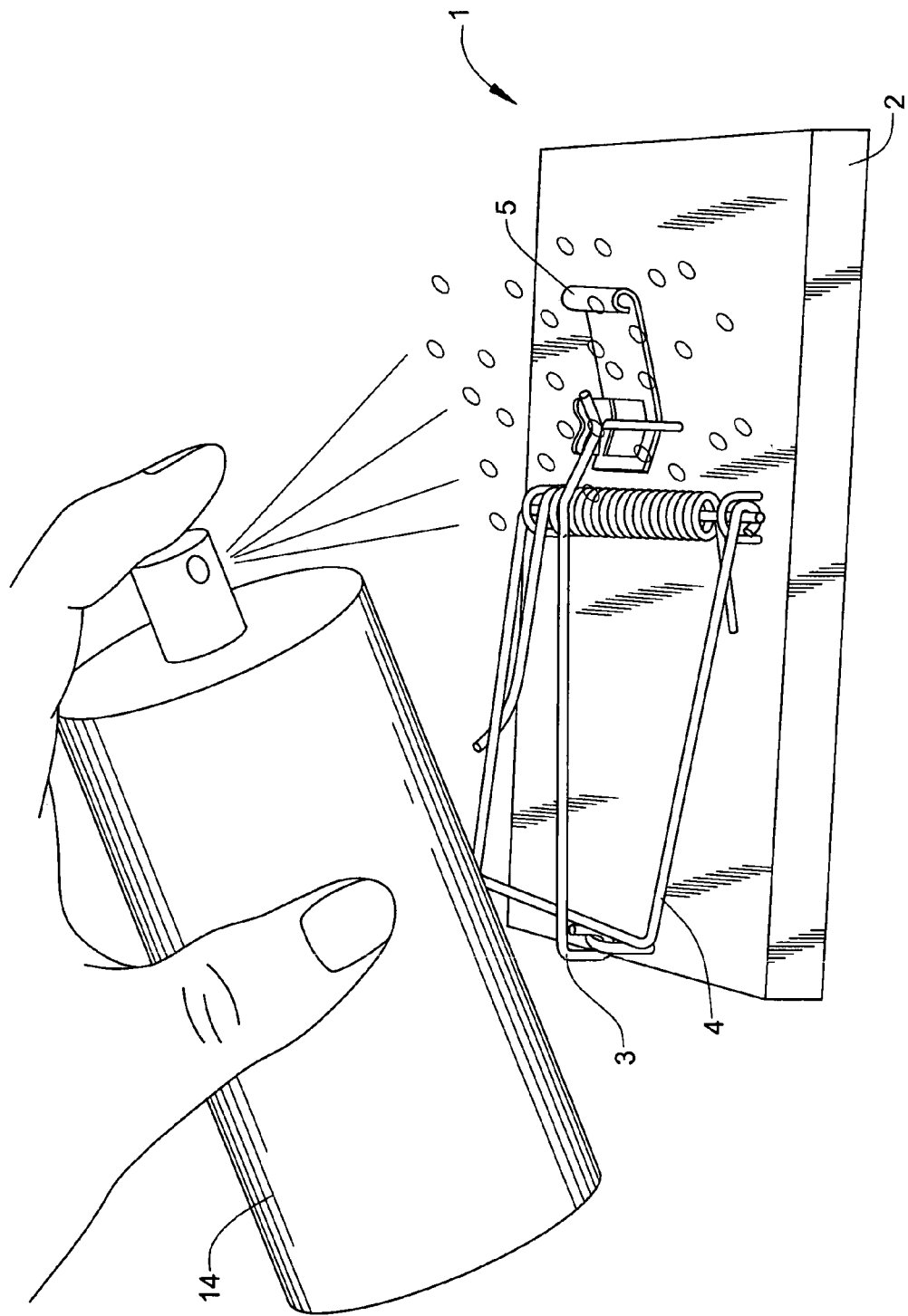
FIG. 5 is a perspective view, illustrating one embodiment of the instant invention wherein the microencapsulated bait is sprayed onto a conventional trap.

FIG. 5 demonstrates another embodiment of the instant invention wherein the microencapsulated scent can be sprayed onto the bait petal 5 of a conventional snap trap. In the preferred embodiment the microencapsulated bait is applied a pressurized aerosol container 14. However, one of ordinary skill would recognize that the microencapsulated scent could be brushed or similarly applied onto the bait petal 5 or anywhere proximate the trap 1. The use of a spray allows the user to apply, or reapply, the microencapsulate bait without touching the trap. The less the trap is handled by the end-user the less likely the targeted pest will shy away from any human odor that might be left on the trap.

Microencapsulated scents and/or flavors utilized in the instant invention are constructed and arranged to last up to twenty years and could be added to multiple traps and stored for extended lengths of time. In this manner the present invention may be utilized to improve efficiency and increase safety of new as well as pre-existing traps.

All patents and publications mentioned in this specification are indicative of the levels of those skilled in the art to which the invention pertains. All patents and publications are herein incorporated by reference to the same extent as if each individual publication was specifically and individually indicated to be incorporated by reference.

One skilled in the art will readily appreciate that the present invention is well adapted to carry out the objects and obtain the ends and advantages mentioned, as well as those inherent therein. Any compounds, methods, procedures and techniques described herein are presently representative of the preferred embodiments, are intended to be exemplary and are not intended as limitations on the scope. Changes therein and other uses will occur to those skilled in the art which are encompassed within the spirit of the invention and are defined by the scope of the appended claims. Although the invention has been described in connection with specific preferred embodiments, it should be understood that the invention as claimed should not be unduly limited to such specific embodiments. Indeed, various modifications of the described modes for carrying out the invention which are obvious to those skilled in the art are intended to be within the scope of the following claims.

What is claimed is:

1. A reusable, non-perishable bait in combination with a mechanically actuated trap for luring and retaining a rodent therein, said combination comprising:

a reusable, non-perishable bait including a removable substrate having a first surface including a plurality of micro-sized capsules produced by a microencapsulation process thereon, and a second surface having an adhesive to removably attach said substrate to a snap trap, wherein said microcapsules each contain at least one attracting agent selected from the group consisting of food scent, food flavor, and pheromone for attracting said rodent surrounded by a polymer membrane; and a snap trap constructed and arranged for mechanically trapping a rodent therein, said snap trap comprising:
a base member having a spring activated bail secured to said base member for movement between a loaded position and an unloaded position, wherein said spring activated bail is biased to said unloaded position and is constructed and arranged to mechanically retain said rodent while in said unloaded position;
a trigger mounted to said base, said trigger having a bait receiving portion constructed and arranged to receive said non-perishable bait thereon;
a locking bar constructed and arranged to restrain said spring activated bail in said loaded position until said trigger is actuated;
wherein said rodent is attracted to said non-perishable bait attached to said snap trap, actuation of said trigger by said rodent releases said spring activated bail to said unloaded position, and said snap trap is adapted to mechanically retain said rodent therein.

2. The combination reusable, non-perishable bait and snap trap as defined in claim 1, wherein said at least one attracting agent is at least two members selected from the group consisting of food scent, food flavor, and pheromone.

3. The combination reusable, non-perishable bait and trap as defined in claim 1, wherein said polymer membrane is permeable, thereby forming a controlled time-release of said at least one attracting agent.

4. The combination reusable, non-perishable bait and trap as defined in claim 1, wherein said polymer membrane is rupturable, thereby instantly releasing said at least one attracting agent when ruptured.

5. A method for luring rodents into a snap trap comprising the following steps:
providing a snap trap for trapping a rodent therein, said snap trap including; a base member having a spring activated bail secured to said base member, said bail movable between a loaded position and an unloaded position, whereby said bail is biased to said unloaded position and is constructed and arranged to mechanically retain said rodent while in said unloaded position; a trigger mounted to said base, said trigger having a bait receiving portion constructed and arranged to receive a non-perishable bait thereon; a locking bar constructed and arranged to restrain said spring activated bail in said loaded position until said trigger is actuated;
applying a microencapsulated bait onto said snap trap, wherein said microencapsulated bait includes a removable substrate having a first surface having a plurality of micro-sized capsules produced by a microencapsulation process, and a second surface having an adhesive to removably attach said substrate to said snap trap, wherein said micro-sized capsules each contain an agent for attracting a rodent to said snap trap, wherein said micro-sized capsules each comprise said agent being surrounded by a polymer membrane capable of emitting said agent;
activating said microencapsulated bait;
securing said bail in said loaded position with said locking bar;
releasing said bail to move to said unloaded position for capturing said rodent attracted to said microencapsulated bait when said rodent actuates said trigger;
mechanically retaining said rodent with said snap trap.

6. The method for luring rodents into a snap trap as defined in claim 5, wherein said attracting agent is one member selected from the group consisting of food scent, food flavor, and pheromone.

7. The method for luring rodents into a snap trap as defined in claim 5, wherein the step of activating said microencapsulated bait includes rupturing at least a portion of said polymer membranes of said micro-sized capsules, thereby releasing said attracting agents.

* * * * *